United States Patent [19]
Riegler

[11] Patent Number: 4,739,167
[45] Date of Patent: Apr. 19, 1988

[54] DEVICE FOR SYNCHRONOUS MODULATION, SYNCHRONOUS LIGHT-PATH SWITCH-OVER AND CONTROL-SIGNAL DERIVATION FOR STEP-DRIVE CONTROLLED MODULATION AND SWITCH-OVER DEVICES

[75] Inventor: Heinz Riegler, Jena, German Democratic Rep.

[73] Assignee: Jenoptik Jena GmbH, Jena, German Democratic Rep.

[21] Appl. No.: 875,857

[22] Filed: Jun. 18, 1986

[30] Foreign Application Priority Data

Jul. 1, 1985 [DD] German Democratic Rep. ................................ 2780604

[51] Int. Cl.$^4$ .............................................. G02B 26/04
[52] U.S. Cl. .................................... 250/347; 250/343; 250/351
[58] Field of Search ............... 250/347, 343, 348, 351, 250/373; 356/436, 437

[56] References Cited

U.S. PATENT DOCUMENTS 3,659,941 5/1972 Tong ........................................ 356/51
4,491,730 1/1985 Pedersen .............................. 250/343

FOREIGN PATENT DOCUMENTS 2949110 6/1981 German Democratic Rep. ................................ 356/436

Primary Examiner—Janice A. Howell
Assistant Examiner—Constantine Hannaher
Attorney, Agent, or Firm—Jordan and Hamburg

[57] ABSTRACT

Device for synchronous modulation, synchronous light-path switch-over and control-signal derivation for step-drive controlled modulation and switch-over devices, especially for multibeam spectral analysis equipment and preferably for the infrared region of the spectrum, in which the radiation modulation is effected by a rotating light stop and the light path switch-over between a measuring beam and a reference beam is effected by pivoting mirrors. The device provides for the use of only a single photosensor. The synchronization between the stepping motor for moving the light stop and the stepping motors for moving the mirrors is effected via a counting logic and common clocking. Moreover, set pulses are generated to set the mirrors in defined positions, and control signals are generated for further processing.

2 Claims, 3 Drawing Sheets

DEVICE FOR SYNCHRONOUS MODULATION, SYNCHRONOUS LIGHT-PATH SWITCH-OVER AND CONTROL-SIGNAL DERIVATION FOR STEP-DRIVE CONTROLLED MODULATION AND SWITCH-OVER DEVICES

BACKGROUND OF THE INVENTION

The invention can be used where radiation is interrupted periodically by a light stop and the radiation, so modulated, must be switched over for two optical paths. Moreover, control signals are provided for the further processing of measured values. The invention is suitable preferably for infrared spectrophotometers, which work according to the double-beam method.

In the DDR Patent No. 148,985, a device for the modulation, light-path switch-over and the derivation of the necessary control signals is described for the infrared range of the spectrum in connection with a spectrophotometer. A synchronous motor drives a chopper disk, which carries three control tracks. The outer track, on the one hand, serves for interrupting the radiation of the photometer periodically, the radiation being modulated with $f_m$. On the other hand, the control signal for processing the measured value, for example, for controlling a voltage-frequency convertor, is generated on an optocoupler. Because of the phase shift by the radiation detector and the electronic amplifier, the optocoupler must be adjustable for the phase adjustment, that is, it must be rotatable about the axis of the chopper disk. Two further optocouplers are disposed to be stationary. They supply the pulse and direction of rotation signals for the optical switch-over device. The switch-over device itself comprises two pivoting mirror groups, each pivoting mirror being driven by a stepping motor. The first group of pivoting mirrors is disposed in front of the sample space, the second group of pivoting mirrors behind the sample space. The test sample and the reference sample are placed in the sample space. The radiation is passed either through the test sample or the reference sample, depending on the momentary position of the two groups of pivoting mirrors. The measured value M or the reference value R is thus formed. The two groups of pivoting mirrors must work synchronously with one another and with the chopper disk. For this purpose, each of the two groups of pivoting mirrors carries two optocouplers. A logic circuit compares the information of the optocouplers of the chopper disk with that of the optocouplers of the groups of pivoting mirrors. For synchronizing the device for the modulation and the light-path switch-over, six optocouplers are required; if the optocoupler for producing the control voltage, for example for the voltage-frequency converter, is included, a total of seven optocouplers is required. This means a large expenditure for mechanical parts and electronic components, lines and plug-in connections and the expense of installing the groups and adjusting and checking them. The reliability, which is influenced by the number of parts and components and by the difficulties encountered in installing them, is slight.

It is an object of the invention to provide, at the least possible cost, a device for synchronous modulation, synchronous light-path switch-over and control-signal derivation and to increase the reliability substantially relative to the state of the art. Moreover, the inventive device shall be as universally usable as possible.

SUMMARY OF THE INVENTION

It is the task of the invention to provide a device for the synchronous modulation, synchronous light-path switch-over and the derivation of control signals for stepping-drive controlled modulation and switch-over devices, especially for multibeam spectral analysis equipment and preferably for the infrared region of the spectrum, with the least possible expenditure for components and assembly, to improve the reliability substantially and to make it possible to use the equipment with a 50 Hz and a 60 Hz network without changes or readjustments. The task is accomplished in accordance with the invention by means of a rotating light stop for modulating the radiation and by means of pivoting mirrors to switch over the light path between the measurement and reference beams, owing to the fact that a single sensor for the analysis signal is connected optically to the output of the modulation device for deriving the synchronization signal, that this synchronization signal is applied over a threshold switch to the digitalization device, a frequency divider, a multiplexer and a first pulse shortener for the positive and negative slopes to a reset input of a counter, clocked in a manner known per se by the clock frequency, that the threshold switch is connected at the output side via a first adjustable timing device with a second adjustable timing device, at the output of which a control signal for demodulation is applied, that the counter is connected at the output side with a logic circuit for generating a specified number of pulses as well as with a second and third pulse shortening stage, that the second and third pulse shortening stages are connected at the output side with the set inputs, the logic componentry is connected at the output side via a gate circuit with the inputs of the step signal generating systems and the multiplexer, at the first input of which the synchronization signal is applied and at the second input of which the signal for selecting the switch-over frequency is applied, is connected at the output side with the directional inputs of the stepping-drive selection circuits of the light path switch-over device and that mechanical stops for limiting the motion during the synchronization process are provided at the pivoting mirrors of the switch-over device.

The objective is accomplished in accordance with the invention in a further advantageous manner owing to the fact that the threshold switch is connected at the output side with the information input of the flip-flop, at the output of which signals for demodulating are applied, and with the input of a fourth pulse shortener for positive and negative slopes, and that the fourth pulse shortener is connected at the output side over the first adjustable timing device with the clock input of the flip-flop.

By such means, an adjustable timing device can be dispensed with and the costs of assembling and adjusting can be reduced further and the reliability increased even more.

Compared to the state of the art, six optocouplers, their selection and evaluation circuits, as well as a large number of mechanical elements can be dispensed with by means of the invention. As a result, the technical-economic effort and the adjustment of the operational elements is reduced to a minimum.

BRIEF DESCRIPTION OF THE DRAWINGS

By utilizing a uniform clock frequency at all clock-controlled operational elements, it becomes possible to use the inventive solution with 50 Hz as well as with 60 Hz networks without changes or readjustments.

The invention is explained in greater detail below by means of the drawings.

DESCRIPTION OF THE PREFERRED EMBODIMENTS

Figure 1:
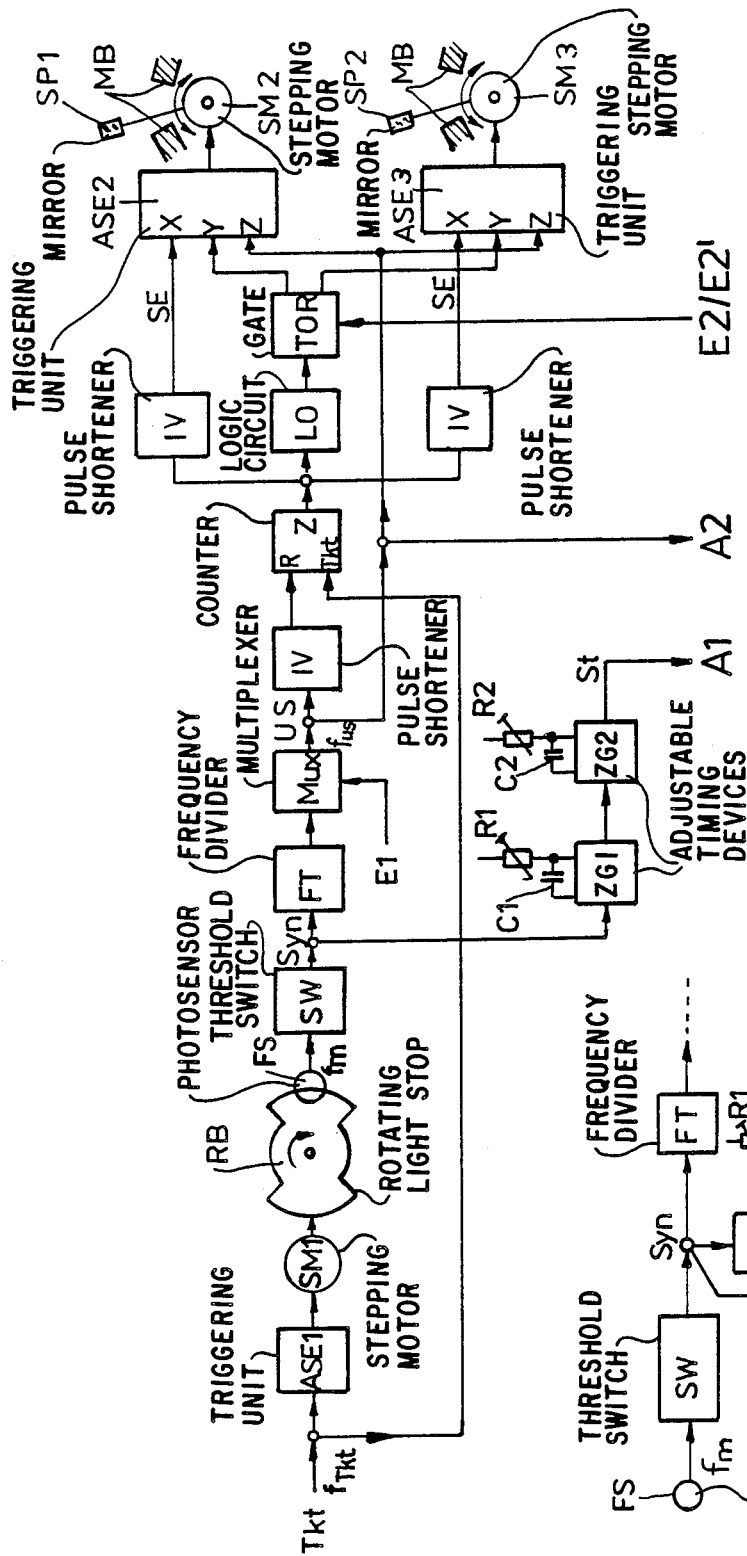
FIG. 1 shows a schematic representation of the circuit elements and their functional connections in the form of a block circuit diagram.
Figure 3:
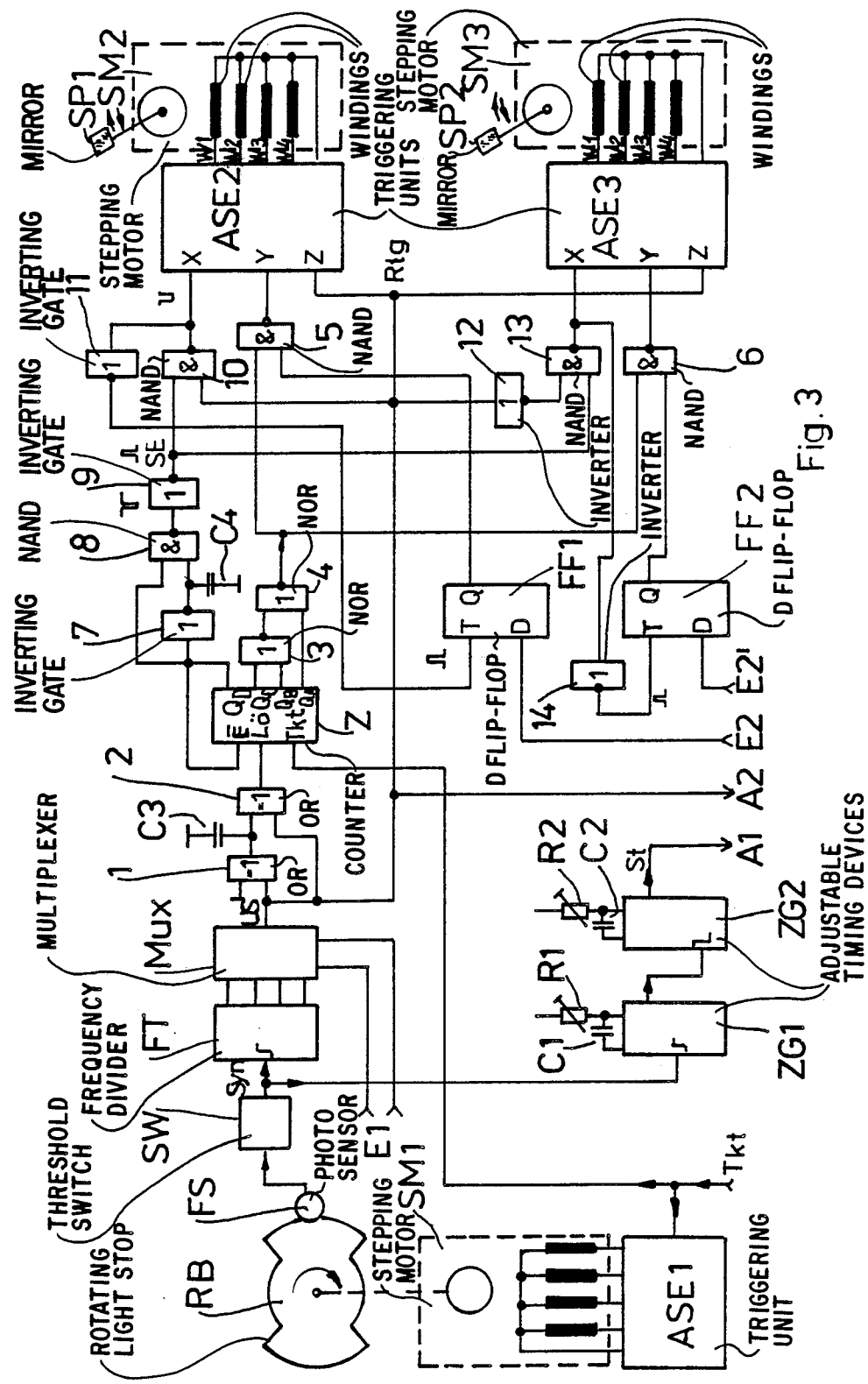
FIG. 3 shows a schematic representation of the circuit elements and their logical connections.

As shown in FIGS. 1 and 3, the stepping motor SM1 is triggered with a step angle of 10° by the triggering unit ASE1. At the clock input TKt, the clock has a frequency of $f_{TKt}=225$ Hz.

The rotating light stop RB, driven by the stepping motor SM1, produces a modulated radiation with a modulation frequency $f_m=12.5$ Hz. The same frequency is produced by the photosensor FS. This signal is supplied to the threshold switch SW, at the output of which the rectangular signal, labeled Syn, is produced as synchronization signal. Since the switch SW has a threshold value, it digitizes the output of the photosensor FS, and hence may be considered to be a digitizing device.

With this signal, the start (LH slope) of the control signal St for the inphase rectification is shifted by the time T1 via the adjustable timing device ZG1 by means of the adjustable resistance R1 in conjunction with the capacitor C1. The temporal length T2 of the control signal St for the inphase rectification is produced in the second adjustable timing device ZG2 with the adjustable resistance R2 and the capacitor C2.

The synchronization signal Syn is divided in frequency by the frequency divider FT. The multiplexer MUX, which is triggered by the signal at input E1, selects an output signal of the frequency divider FT. This selected signal, which is at the output of the multiplexer MUX, is referred to as the switch-over signal US with the switch-over frequency $f_{US}=\frac{1}{2}n \times f_m$.

When n=1, the radiation is passed alternately through the test sample and the reference sample by means of the optical switch-over system. When n=8, the radiation is passed eight times through the test sample and subsequently eight times through the reference sample. The switch-over frequency $f_{US}$ would thus be $f_{US}=1/16\times 12.5$ Hz $=0.78$ Hz.

The switch-over signal US appears at the output A2. It is the identification signal (H=measured value, L=reference value) for the subsequent microcomputer and serves, moreover, as directional signal for the triggering units ASE2 and ASE3. From the LH and HL slopes of the switch-over signal US, the pulse shortener IV, consisting of the two exclusive OR gates 1 and 2 in conjunction with the capacitor C3, produces short H pulses for resetting the counter Z. The clock signal TKt switches the counter Z further until, when the counter reaches a count of eight, the feedback from output $Q_D$ to the release input E of the counter Z blocks the clock input of the counter Z. The NOR gates 3 and 4 (which form the logic circuit LO of FIG. 1) generate three step pulses Sch from the output values $Q_A$ to $Q_C$ of the counter Z for each direction Rtg. These reach the triggering units ASE2 and ASE 3 via the NAND gates 5 and 6 (which form the gate circuit TOR of FIG. 1) only when the Q outputs of the D flip-flops FF1 and FF2 are at the H potential.

The set pulses SE are generated from the LH slopes of the output $Q_D$ of the counter Z by the gates 7, 8, 9 and the capacitor C4. When the directional signal Rtg=H potential, the set pulse from the NAND gate 10 is transferred for the triggering unit ASE2. The stepping motor SM2, triggered by the triggering unit ASE2, is to move three steps to the left in the example. The synchronization, which corresponds to the left position of the mirror SP1, then takes place due to the set pulse SE. The set pulse SE turns on the windings W1 and W3 of the stepping motor SM2 via the triggering uint ASE2 and thus forces the synchronization, in the event that it had not yet been established. Moreover the set pulse SE reaches the clock input of the D flip-flop FF1 negated via gate 11. If the step motor SM2, for reasons still to be explained, is to remain in the left position, there must be an L potential over the input E2 at the D input of the D flip-flop FF1 at the time of the set pulse SE. By these means, the Q output of the D flip-flop FF1 also changes to the L potential and the NAND gate 5 does not transfer any stepping pulses Sch to the triggering unit ASE2. With an H potential at the input E2', the stepping motor SM3 continues to run, because the stepping pulses Sch are transferred via the NAND gate 6 to the triggering unit ASE3. In the mode of operation, in which one pivoting mirror unit is stationary in one defined end position, while the other pivoting mirror unit runs, the signal sequence zero, reference, zero, . . . etc. or the signal sequence zero, measurement, zero . . . etc. results. These signal sequences are required for the mathematical correction of the transmission values. The directional signal Rtg is the same for the triggering units ASE2 and ASE3. With this, both mirrors SP1 and SP2 move in the same direction. The gate 13 transmits the set pulse SE only when the stepping motor SM3 has carried out three steps to the right. When there is synchronization, this corresponds to the switched-on state of the windings W1 and W4 of the stepping motor SM3. The windings W1 and W4 are also switched on with the set pulse SE by the stepping motor SM3. If the stepping motor SM3 is to stop in the right end position, an L potential must be applied at the input E2'. The set pulse SE for the triggering unit ASE3 follows after three steps to the right. The set pulse SE furthermore arrives at the beat input of the D flip-flop FF2 negated via gate 14. With this, the output Q of the D flip-flop FF2 changes to the L potential and the NAND gate 6 does not transmit any stepping pulses Sch to the triggering unit ASE3. The step motor SM3 holds the mirror SP2 in the right end position.

It is a prerequisite for assigning the stepping motors SM to the respective mirrors SP that the the group installation by means of a mechanical device is carried out with the stepping motor in a stationary defined energized state. The stepping motors SM1 and SM2 have mechanical stops MB as illustrated in FIG. 1.

Figure 2:
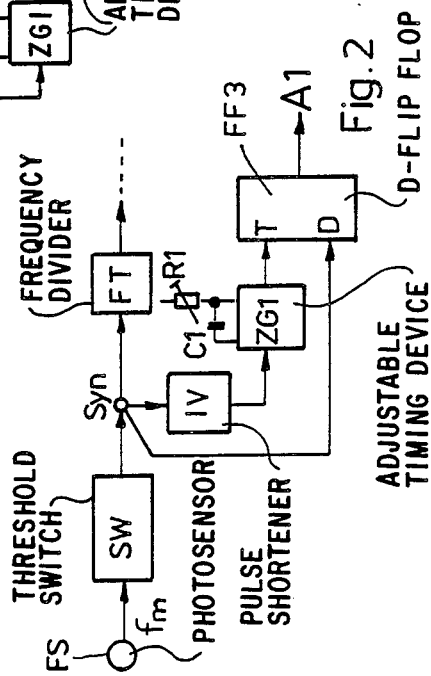
FIG. 2 shows a schematic representation of a further variation of a circuit part of FIG. 1.

FIG. 2 shows the schematic representation of a further circuit variation of a circuit part of FIG. 1. In this variation of the circuit, the adjustable timing device ZG2 is replaced by an additional pulse shortener IV and a further D flip-flop FF3. Moreover, the clock input of the D flip-flop FF3 is connected to the output of the first adjustable timing device ZG1 and the clock input is connected with the synchronization signal Syn. By these means, the adjusting (setting) effort is reduced and the reliability with respect to drift and breakdown is increased further owing to the omission of an adjustable timing element. It is a prerequisite for the use of this variation that the synchronization signal Syn has practically a symmetrical course, that is that the times for the H and the L potential are equal.

Figure 4:
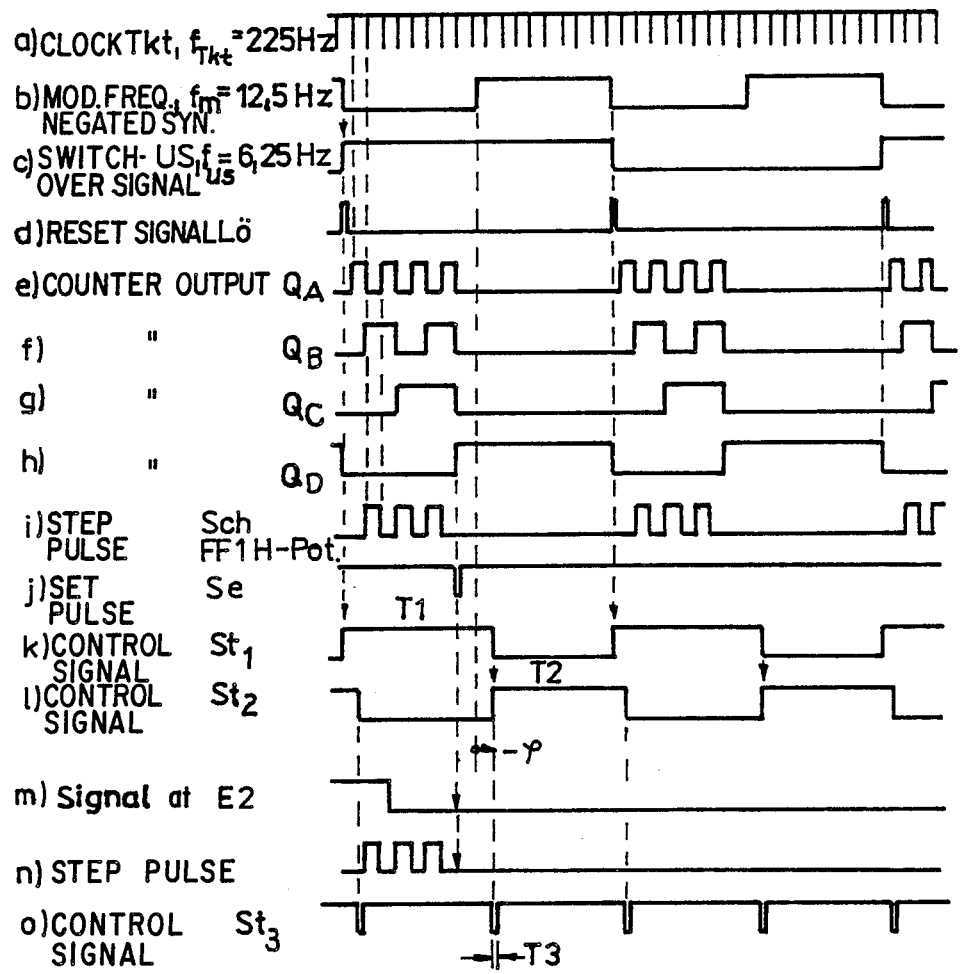
FIG. 4 shows the temporal allocation of the signals of the construction of FIG. 3.

FIG. 4 shows the temporal assignment of the signals of the construction of FIG. 3. The signals for the triggering unit ASE3 can be omitted because of the identical mode of action.

(a) Beat Tkt with the clock frequency $F_{TKt}=225$ Hz.

(b) Modulation of the optical radiation with the modulation frequency $f_m=12.5$ Hz. This signal is identical with the negated synchronization signal Syn.

(c) Switch-over signal US at the same time is the directional signal Rtg and the signal for identifying K; L level=reference value R and H level=measured value M.

(d) resetting signal Lö, derived from the LH and HL slopes of the switch-over signal US.

(e) to (h) Output signals $Q_A$ to $Q_D$ of the counter Z.

(i) Step pulses Sch for the triggering units ASE2 and ASE3. Since the direction Rtg (compare with c) reverses after every three steps Sch, a swivelling motion of the mirrors SP1 and SP2 is produced (Sch=$Q_A(Q_B V Q_C)$).

(j) Set pulses SE for the triggering unit ASE2, derived from the LH slope of $Q_D$ at Rtg=H potential.

(k) Control signal St1—the LH slope is produced by the slope of the synchronization signal. After the hold time T1, the level jumps back to the L potential.

(l) Control signal St2 for the inphase rectification for a phase shift $\psi$ relative to the modulation signal (compare b). The LH slope is produced by the HL slope of the control signal St1.

(m) Signal at the input E2 with specified course.

(n) Step pulse Sch as a function of the signal at the input E2 after the set pulse SE.

(o) Control signal St3 for analog/digital conversion, derived from the control signal St2 by evaluating the slopes and subsequent monostable multivibrator with the hold time T3.

What is claimed is:

1. In a device for synchronous modulation, synchronous light-path switch-over and control signal derivation for step-drive controlled modulation and switch-over devices, in which light modulation is effected via a rotating light stop and the light path switch-over between a measuring beam and a reference beam is effected by pivoting mirrors, the improvement wherein a single sensor is optically coupled to the output of the modulation light stop for deriving a synchronization signal, the synchronization signal is applied to a threshold switch for digitalization the output of the switch is applied to a frequency divider, the output of the divider is applied to a multiplexer and thence to a first pulse shortening stage for positive and negative slopes for application to the reset input of a counter, means clocking the counter at a clock frequency, means applying the output of the threshold switch via a first adjustable timing device ot a second adjustable timing device, the output of the second timing device comprising a control signal for demodulation, the output of the counter being connected to a logic circuit for generating a specified number of pulses as well as to second and third pulse shortening stages, the outputs of the second and third pulse shortening stages being connected to the set inputs of stepping motor triggering circuit means, the output of the logic circuit being connected via a gate circuit to the inputs of the stepping motor triggering circuit means, means applying the synchronization signal to the first input of the motor triggering circuit means, the output of the stepping motor triggering circuit means being connected to directional inputs of step-drive selection circuits of the light path switch-over device, and further comprising mechanical stops for limiting the motion of the switch-over device during the synchronization process at the pivoting mirrors of the switch-over device.

2. Device as defined in claim 1, wherein the output of the threshold switch is connected to the data input of a flip-flop, at the output of which signals for demodulating are produced, and to the input of a fourth pulse shortening stage for positive and negative slopes, and the output of the fourth pulse shortening stage is connected via an adjustable timing device to the clock input of the flip-flop.

* * * * *